July 6, 1926.  
A. W. CORWIN  
TRAILER COUPLER  
Filed May 17, 1923
1,591,659
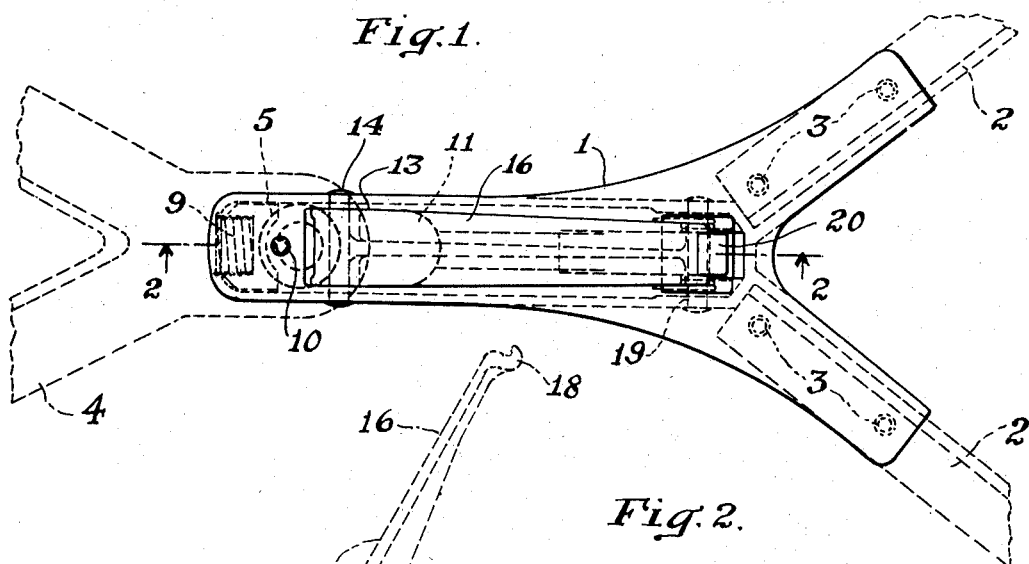
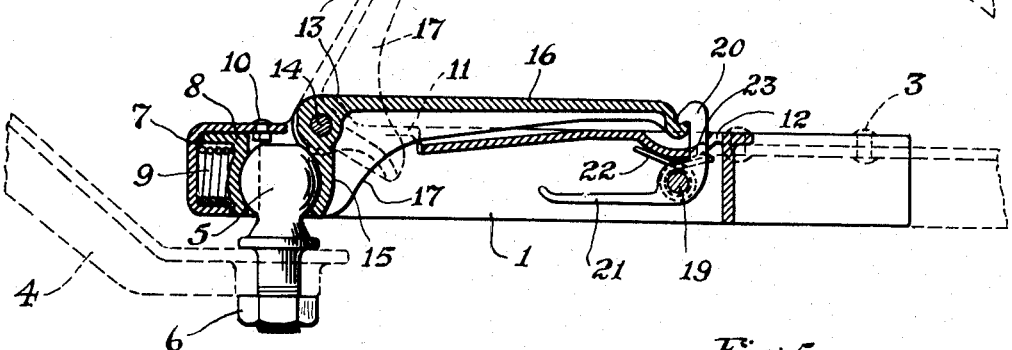
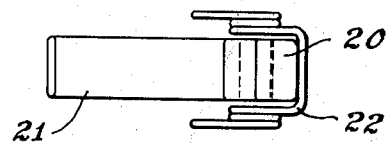
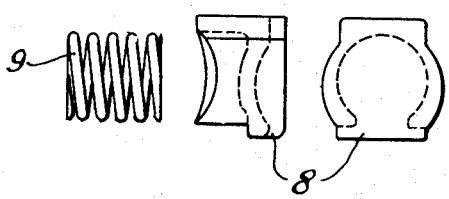
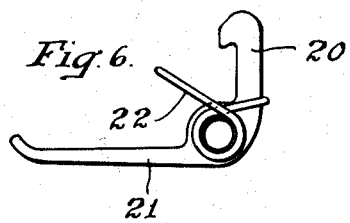
Inventor  
Allen W. Corwin  
By his Attorney Patented July 6, 1926.

1,591,659

UNITED STATES PATENT OFFICE.

ALLEN W. CORWIN, OF WELLSVILLE, NEW YORK.

TRAILER COUPLER.

Application filed May 17, 1923. Serial No. 639,510.

This invention relates to coupling devices and particularly to a coupling device adapted to operatively connect two vehicles. The general object of the invention is to provide an improved coupling mechanism for the purpose defined.

My present invention relates more specifically to trailer couplers of the type shown in my Patent No. 1,351,098 and the primary object of the invention is to provide a coupler which for certain purposes and under certain conditions possesses various advantages over that shown in my said patent. Through experience, I have found that, to be safe under heavy loads, a coupler must be of a heavy and rigid construction and at the same time must be sufficiently resilient to take up lost motion and wear in a manner to avoid looseness and chatter. Furthermore to facilitate the cheap manufacture of couplers without sacrificing any of the desired features stated, the same must be capable of construction without requiring fine machine work and accurate fitting of the various parts of the device. These and other desirable advantages are comprised within the scope of my invention and accordingly one of the objects thereof is to provide an improved trailer coupler having these various novel features.

As illustrated in the accompanying drawing, I provide a coupler device adapted to be secured to the tongue of a trailer and to couple the same to a ball secured to the rear of a tractor vehicle. The coupler has a ball receiving socket therein and a ball engaging element is resiliently mounted in the coupler forwardly of the socket. A lever is provided for engaging the opposite side of the ball whereby the same is resiliently but firmly gripped between the said element and lever. Movement of the lever to grip the ball forces the ball further forward into the socket against the action of the resilient means. A latch is provided for holding the parts in this position. It should be particularly noted that the said resilient mounting provides various advantages to the coupler mechanism as hereinafter described. More specifically, it is an object of my invention to provide an improved trailer coupler of this general type.

With the above and other objects in view, my invention consists in the features of construction and operation set forth in the following specification and illustrated in the accompanying drawing. In such drawing annexed hereto and forming a part of this specification, I have shown one embodiment of my invention but it will be understood that the invention can be otherwise embodied and that the drawing is not to be construed as defining or limiting the scope of the invention, the claims appended to this specification being relied upon for that purpose.

Referring to the figures of the drawing:

Figure 1 is a plan view of a trailer coupler embodying my invention.

Fig. 2 is a vertical longitudinal section taken on line 2—2 of Fig. 1.

Fig. 3 is a detail view showing certain parts in side elevation.

Fig. 4 is a detail view showing one of such parts in end elevation.

Fig. 5 is a plan view of the latch mechanism shown in Figs. 1 and 2.

Fig. 6 is a side elevation thereof.

Referring more specifically to the drawing by reference characters, 1 indicates the body portion or member of the coupler. As illustrated, this member is bifurcated at one end to attach the same to the relatively angular tongue elements 2 of a trailer vehicle, such attachment being made by rivets 3 or otherwise. The numeral 4 indicates the rear of a tractor vehicle on which is mounted a ball 5, the ball being mounted on an upwardly extending shank secured in place by a nut 6. The body member 1 is adapted to be coupled to this ball as illustrated in the drawing and hereinafter described.

The member 1 is preferably U-shaped in cross section and the forward end thereof is closed to form an end pocket 7. Slidably mounted in this pocket is an element 8 adapted to engage one side of the ball as illustrated in Fig. 2. This element is shaped to conform to the inner shape of the pocket whereby the element is held in the proper ball engaging position therein. A compression spring 9 mounted in the pocket between the end thereof and the element 8 normally operates to move the element toward the ball. Stop means as a rivet 10 is provided for limiting this movement of the element.

The intermediate portion of the top wall of the body 1 is struck up to the shape shown in Fig. 2 and openings 11 and 12 are formed therein. A lever 13 is pivoted at 14 in the opening 11 and a short arm 15 extending downwardly therefrom is adapted to engage the opposite side of the ball, the opening between the element 8 and the arm 15 providing a socket for receiving the ball. The lever, which is of heavy, rigid construction, also has a relatively long operating arm 16, the two arms preferably being integrally connected and reenforced by a rib 17 spanning the angle subtended between the arms.

The free end of the long arm 16 is formed into a downwardly extending hook 18 adapted to be engaged by a latch mounted in the opening 12. The latch is pivoted to the member 1 at 19 and has a vertical arm-engaging head 20 and a horizontally extending tail 21. A spring 22 is provided on the pivot for normally swinging the head 20 toward the arm 16, a stop 23 being adapted to limit this movement. It will be noted that the interengaging ends of the arm and head are beveled whereby in the clamping operation the end of the arm engages the head and forces the same backwardly against the action of the spring 22.

Outward movement of the element 8 is limited by the stop 10 and the space between the element and the arm 15 provides a socket for receiving the ball 5. In coupling the member 1 to the ball, the latch 20 being disengaged from the arm 16, the ball socket is placed over the ball and downward pressure on the member 1 will seat the ball in the socket. The operator then presses the arm 16 downwardly until the latch 20 automatically snaps into engagement therewith. The lever may be released merely by lifting upwardly on the tail 21 of the latch.

The ball engaging faces of the element 8 and arm 15 are shaped to conform to the ball and the ball-securing operation of the lever resiliently grips the ball between these faces against the action of the spring 8. It should be particularly noted that compression of the spring 9 in the ball-clamping operation moves the ball 5 further into the pocket 7 wherein the same is firmly held when the latch is engaged as shown in full lines in Fig. 2. The disengaged position of the lever is shown in dash lines in Fig. 2.

The lever is of a rigid and substantial construction and the spring 9 should be made of a strength to correspond therewith. As thus constructed, the ball gripping parts are heavy and substantial and at the same time are adapted to accurately fit the ball and to resiliently grip and hold the same in all working positions of the member 1 on the ball. The parts are so arranged that the ball is accurately and securely gripped without accurate fitting of the parts in manufacture being necessary.

It will be understood that in the clamping or attaching operation, the operator pushes downwardly on the body 1 and on the arm 16. Likewise in the unclamping operation, the operator lifts upwardly on the tail 21 of the latch to release the lever and then lifts the body 1 upwardly from the ball. Thus the attaching and detaching operations are respectively downward and upward which are the most natural movements in performing such operations. It should furthermore be noted that the spring 9 operates to throw the arm 16 upwardly whenever the latch 20 is released therefrom. This function is of particular advantage as such a detached condition is at once apparent to the driver merely by glancing at the coupler. It may furthermore be stated, however, that the engaging faces of the latch 20 and arm 16 are of such shape and the tail 21 of the latch is so positioned that accidental detachment of the latch is quite unlikely even though the spring 22 should become inoperative.

The only parts of the device subject to much wear are the ball and its engaging elements and the construction provides for easy replacement of these parts. As shown in Fig. 2 the several parts of the coupler are substantially housed within the body 1 and in the coupled position the arm 16 of the lever extends along the body substantially as a part thereof. Furthermore the latch 20 is entirely beneath the top surface of the coupler and is therefore not likely to become accidentally disengaged.

What I claim is:

1. A trailer coupler comprising the combination of a ball member mounted on an upwardly extending shank adapted to be secured to the rear of a vehicle, a member adapted to be secured to the tongue of a trailer and having a socket opening through the bottom thereof for receiving the ball member, a ball engaging element movably mounted in the tongue member forwardly of the socket, a spring normally operative to move the element toward the socket, means for limiting such movement, and means pivoted to the tongue member for engaging the opposite side of the ball, the pivoted means being readily movable about its pivot into and out of ball securing position and being adapted to securely clamp the ball between the said two means against the action of the spring.

2. A trailer coupler comprising the combination of a ball member mounted on an upwardly extending shank adapted to be secured to the rear of a vehicle, a member adapted to be secured to the tongue of a trailer and having a socket opening through the bottom thereof for receiving the ball member, spring pressed ball engaging means in the tongue member forwardly of the socket, and a lever pivoted to the tongue member adjacent the socket, the lever having a short ball engaging arm and a relatively long lever-operating arm and being operative about its pivot to securely clamp the ball between the short arm and the said means against the action of the said spring pressure.

3. A trailer coupler adapted to cooperate with a ball for securing a trailer to a vehicle, comprising in combination, a body having means at one end for securing the same to a vehicle, a ball receiving socket being formed in the body adjacent its other end, a ball engaging element movably mounted in the body forwardly of the socket, spring means for moving the element toward the socket, means for limiting such movement, an element on the body adjacent the socket and adapted to engage the opposite side of the ball, and means cooperating with the last named element for gripping the ball between the two elements against the action of the spring and for holding the parts in such position.

4. A trailer coupler adapted to cooperate with a ball for securing a trailer to a vehicle, comprising in combination, a body having means at one end for securing the same to a vehicle, a ball receiving socket being formed in the body adjacent its other end, a ball engaging element slidable longitudinally in the body forwardly of the socket, a spring for moving the element toward the socket, means for limiting such movement, a lever pivoted to the body adjacent the socket and having a short arm adapted to engage the opposite side of the ball, the lever also being provided with a relatively long operating arm, the lever being movable about its pivot to grip the ball between the short arm and element against the action of the spring, the said long arm extending in the general direction of the body when the ball is gripped, and a spring pressed latch adapted to automatically engage and secure the free end of the long lever when the same is forced to the ball gripping position.

5. A trailer coupler adapted to cooperate with a ball for securing a trailer to a vehicle, comprising in combination, a body having means at one end for securing the same to a vehicle, a ball receiving socket being formed in the body adjacent its other end, a ball engaging element movably mounted in the body forwardly of the socket, spring means for moving the element toward the socket, means for limiting such movement, a securing member pivoted on the body adjacent the top of the socket and comprising two radiating arms, one of such arms being adapted to engage the opposite side of the ball to secure the same in the socket, the other arm being rigid and relatively long and in its operative ball securing position extending lengthwise of the body, and a latch on the body for engaging the free end of the relatively long arm.

6. A trailer coupler adapted to cooperate with a ball for securing a trailer to a vehicle, comprising in combination, a body having means at one end for securing the same to a vehicle, a ball receiving socket being formed in the body adjacent its other end, means for engaging one side of the ball, a rigid two-arm one-piece lever pivoted to the body, the said two arms being integrally connected by a rib spanning the angle subtended between such arms, one arm being adapted to engage the opposite side of the ball and the other arm forming an operating handle for the lever, resilient means whereby the ball is resiliently gripped between the first named means and the ball engaging arm, and means for holding the parts in the ball gripping position.

7. A trailer coupler adapted to cooperate with a ball for securing a trailer to a vehicle, comprising in combination, a body having means at one end for securing the same to a vehicle, a ball receiving socket being formed in the body adjacent its other end, means for engaging one side of the ball, a securing member pivoted on the body adjacent the top of the socket and comprising two radiating arms, one of such arms being adapted to engage the opposite side of the ball to secure the same in the socket, the other arm being relatively long and in its operative ball securing position extending lengthwise of the body, a latch for engaging the relatively long arm for holding the member in the ball gripping position, and spring means for raising the arm upwardly away from the latch when the arm is released.

In testimony whereof, I hereto affix my signature.

ALLEN W. CORWIN.